(12) United States Patent
Daoud et al.

(10) Patent No.: US 6,789,398 B1
(45) Date of Patent: Sep. 14, 2004

(54) MOLD INCORPORATING A HEAT SOURCE AND APPARATUS AND METHOD FOR USING SUCH MOLDS

(75) Inventors: Bassel H. Daoud, Parsippany, NJ (US); David S. Kerr, Morris Plains, NJ (US); Peter M. Mueller, Suwanee, GA (US); Ivan Pawlenko, Holland, PA (US); Larry Samson, Langhorne, PA (US)

(73) Assignee: CommScope Solutions Properties, LLC, Sparks, NV (US)

( * ) Notice: Subject to any disclaimer, the term of this patent is extended or adjusted under 35 U.S.C. 154(b) by 0 days.

(21) Appl. No.: 09/497,045

(22) Filed: Feb. 2, 2000

(51) Int. Cl.[7] .............................. C03B 11/00; C03B 9/00
(52) U.S. Cl. .............................. 65/357; 65/356; 65/276; 65/277; 65/278; 65/279; 65/385; 65/295; 65/355; 65/323; 65/404; 65/DIG. 9; 264/296; 249/98; 249/100; 425/392; 425/403
(58) Field of Search .................. 65/276, 277, 278, 65/279, 292, 108, 109, 110, 357, 385, 295, 299, 283, 323, 404, 356, DIG. 9; 264/296; 249/98, 100; 425/392, 403

(56) References Cited

U.S. PATENT DOCUMENTS

| | | | | |
|---|---|---|---|---|
| 677,161 A | * | 6/1901 | Wilson et al. | |
| 1,591,060 A | * | 7/1926 | Sherrerd | |
| 2,107,979 A | * | 2/1938 | Dichter | 49/23 |
| 4,846,746 A | * | 7/1989 | Prost | 445/22 |

* cited by examiner

Primary Examiner—Peter Chin
Assistant Examiner—Mark Halpern
(74) Attorney, Agent, or Firm—Cohen, Pontani, Lieberman & Pavane

(57) ABSTRACT

A heat source is formed within one piece of a multi-piece mold designed to shape a glass tube. The one piece of the mold can then be used as a source of intense heat to render the glass malleable and to also contribute to shaping the tube in conformance with the mold. In one embodiment, the heat source includes channels formed throughout the one piece of mold for distributing a gas therethrough with jets of gas emanating from the inner surface of the mold piece for heating the tube to be shaped to a desired temperature. In apparatus embodying the invention, there is no need for a separate torch and for moving the torch during the shaping process. Also, in accordance with the invention, better control of the heat supplied to the tube being shaped is obtained.

13 Claims, 12 Drawing Sheets

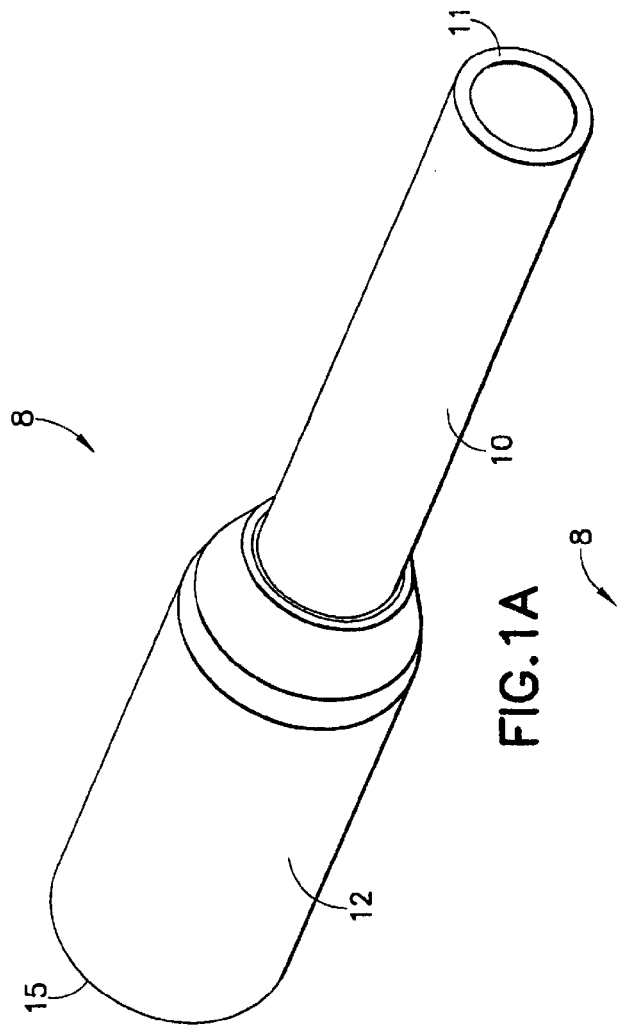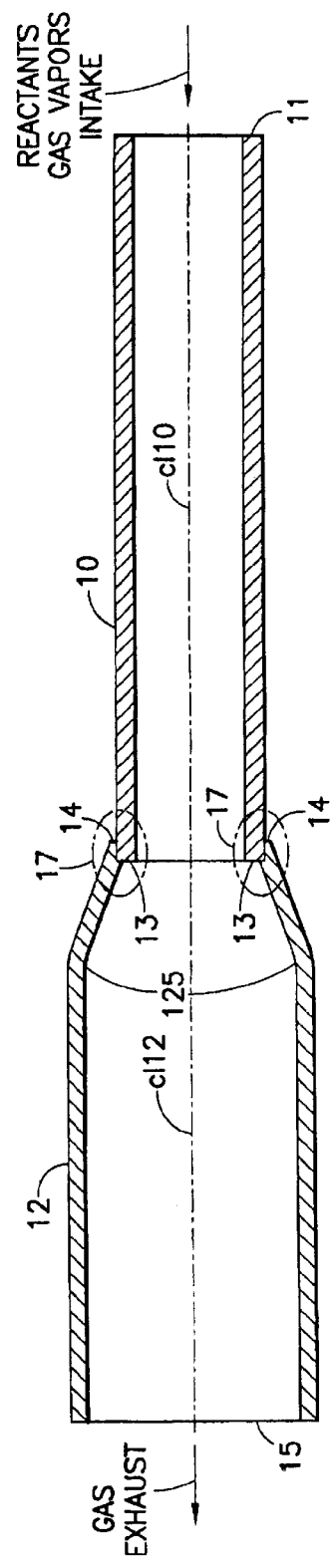

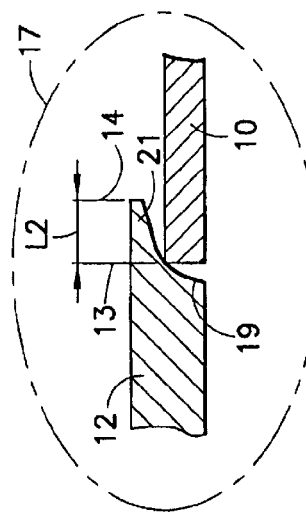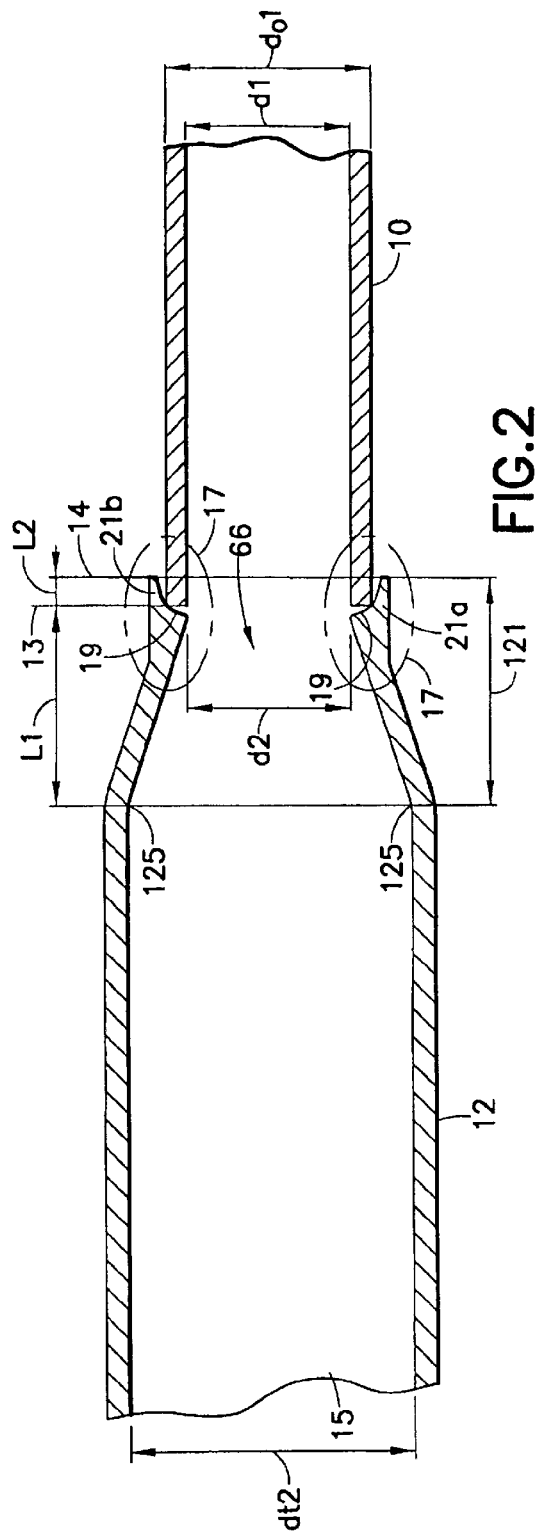

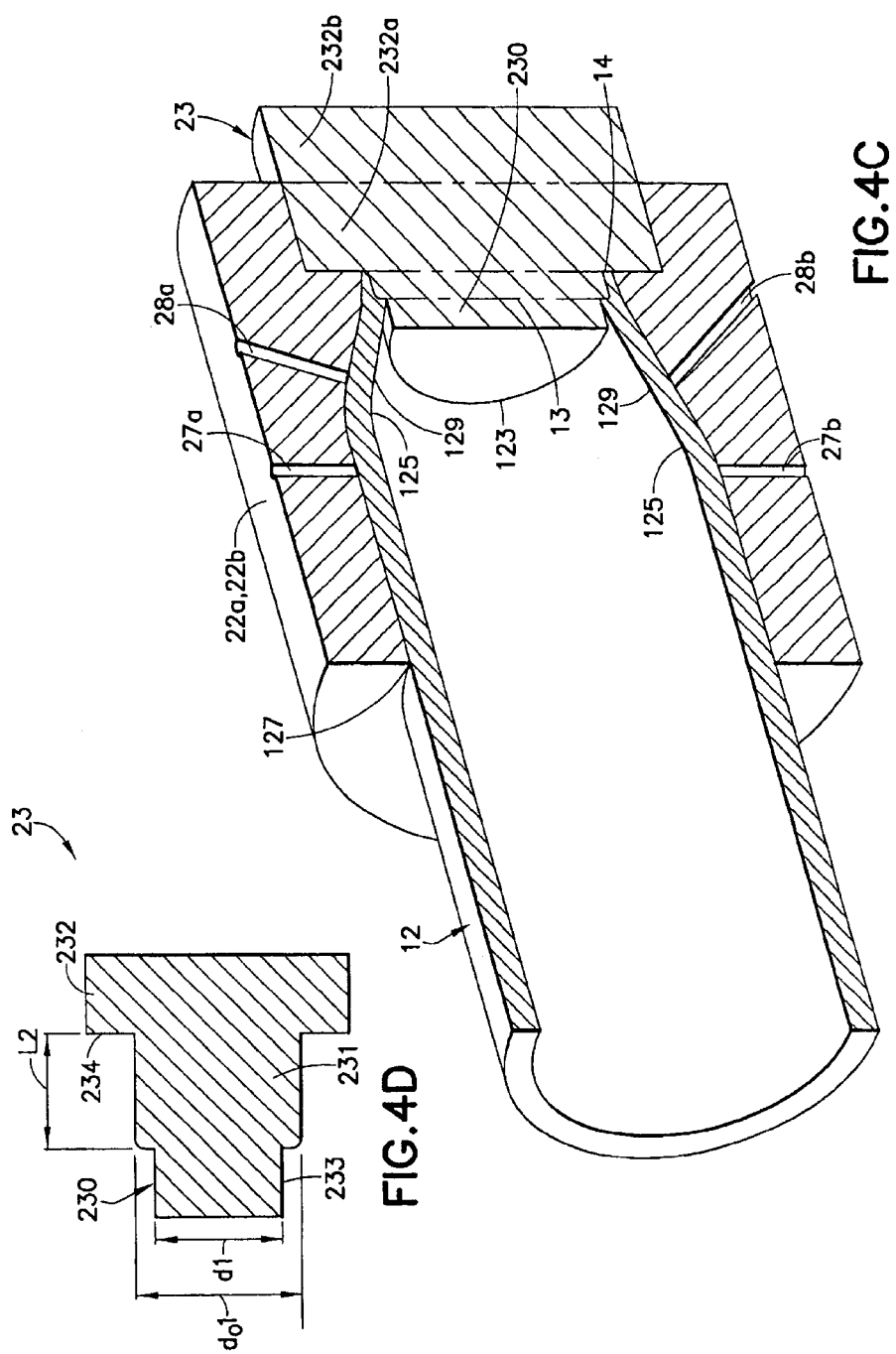

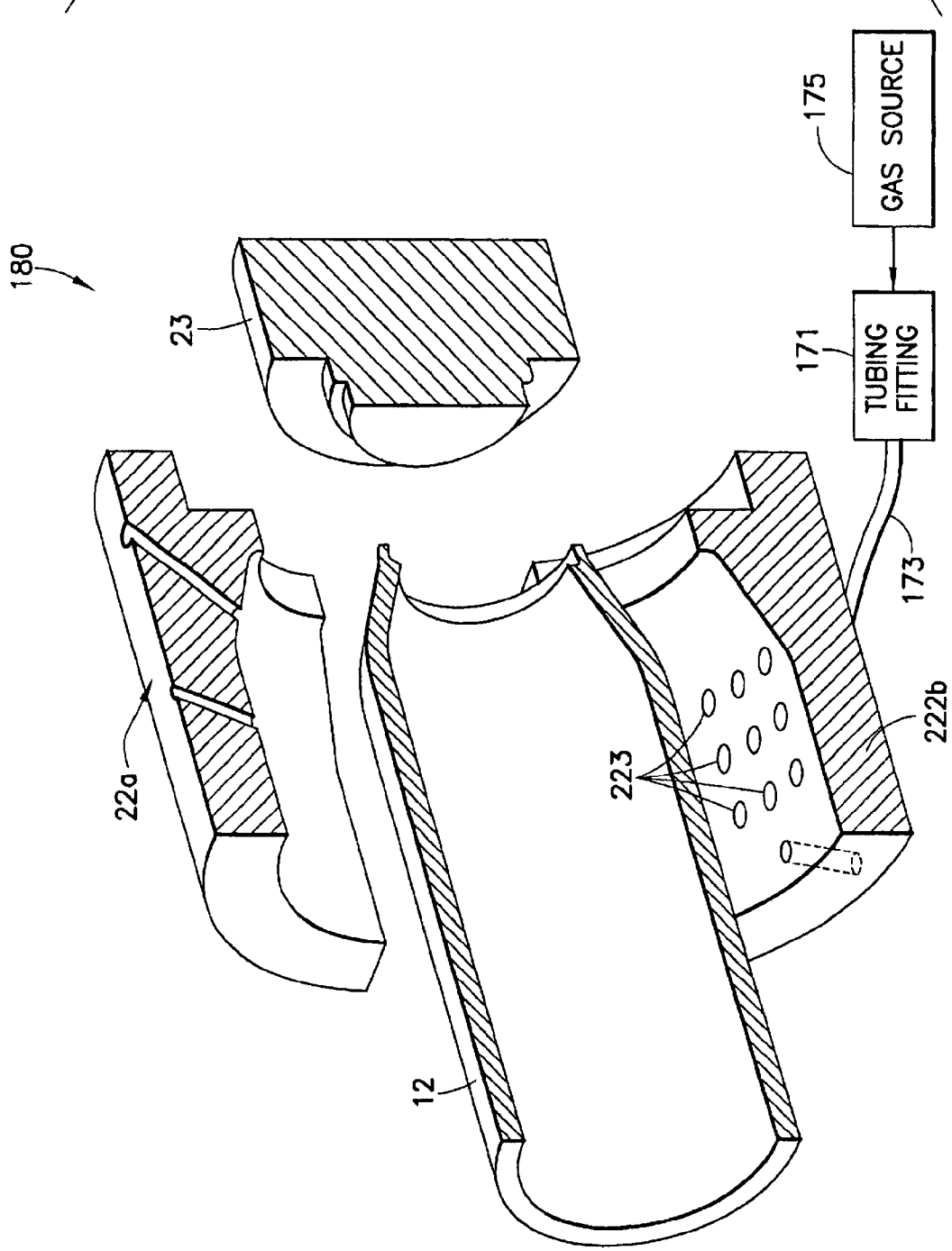

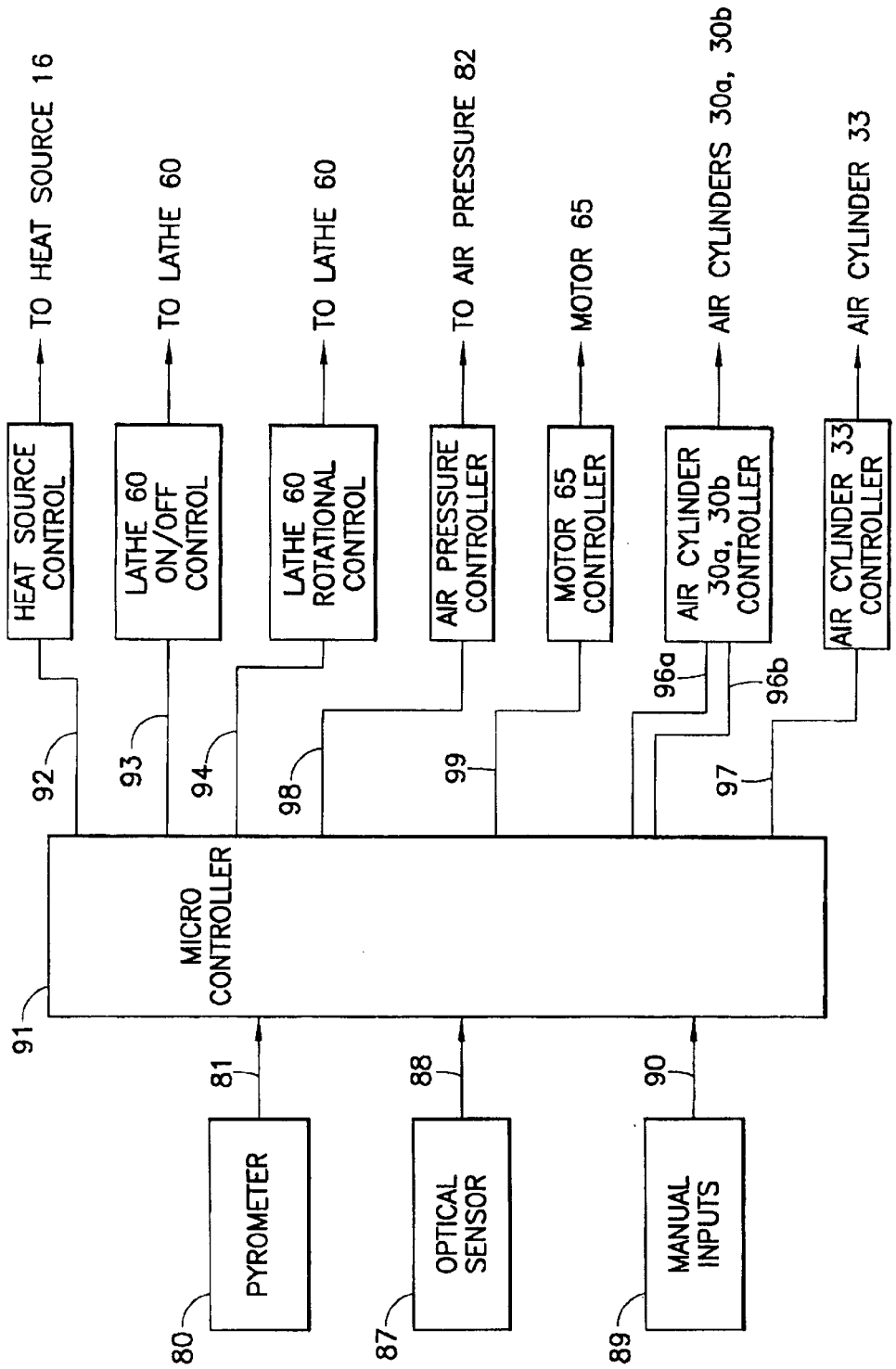

MOLD INCORPORATING A HEAT SOURCE AND APPARATUS AND METHOD FOR USING SUCH MOLDS

This invention relates to apparatus and methods for shaping tubes and, in particular, to shaping glass tubes intended for use in the manufacture of optic fibers and for doing so semi-automatically or automatically.

One process for the manufacture of optical fibers is referred to as the modified chemical vapor deposition (MCVD) process in which the internal wall of a glass cylinder (also referred to herein as the "starter tube" or "preform tube") is coated with uniform layers of reactants and gas vapors to form the rod from which optic fibers will be extruded. To ensure the proper and uniform flow of gases within the starter tube, it is desirable to join, or fuse, the starter tube to an exhaust tube prior to initiating the actual fiber optic manufacturing process.

For optimum results the exhaust tube should provide smooth, continuous flow for the gases escaping from the starter tube to, and through, the exhaust tube. To accomplish this result, the exhaust tube must generally have a larger diameter than the starter tube. However, at their interface and mating ends the exhaust tube must mesh smoothly and continuously with the starter tube and must have a profile which aids in the smooth flow of gases out of the starter tube.

It is also noted that each exhaust tube is intended to be joined (or fused) to a starter tube and that the two "combined" tubes are then operated as a unit. Typically, the combined tubes are mounted in an apparatus in which they are made to rotate for many hours while gases and reactants are being injected into the starter tube under intense heat conditions, for depositing uniform layers to subsequently form optic fibers. To ensure the formation of consistently uniform layers, it is important that the two tubes be aligned very accurately; (i.e., have a common center line) throughout the process.

In presently known systems the end of an exhaust tube designed to mate with a starter tube is shaped manually using a graphite forming tool, or like manual equipment. This process is an "art" dependent on the skills and techniques of the artisan shaping the mating end and interface of the exhaust tube. This is undesirable and problematic because tubes shaped manually have little uniformity and dimensional reproducibility. As a result, numerous defective exhaust tubes are produced. Equally problematic is that, even when an exhaust tube is not defective, the mating of an exhaust tube with a starter tube is subject to alignment problems.

Thus, there is a dual problem of uniformly shaping and contouring the end of an exhaust tube so that the starter tube (at its mating output) meshes smoothly with the exhaust tube at their common interface and of aligning the two tubes accurately. Clearly, the requirements placed on the manufacture of fiber optics is very demanding and very costly. It may take many hours to produce a. fiber optic "preform". Even very small defects, because of their cumulative effect, may result in the loss of much material, energy and time, at great cost to the manufacturer.

Another problem is that in accordance with the prior art when the starter and exhaust tubes are to be joined or fused together, they are cantilevered from spindle chucks. An operator must support the cantilevered tubes by manual means or through the use of a "jack" device and raise or lower the rotating starter and exhaust tubes to achieve co-axial alignment with the end of the exhaust tube. Heat is applied at the support point of the starter tube to stress relieve the starter tube as the operator applies a relocating force to the starter and exhaust tubes. The quality of the co-axiality between the two tubes in this butt-splice technique is a function of the operator's skill. This is undesirable because the quality of the results is not predictable.

Various solutions to the problems of shaping glass tubes are disclosed in Applicants' co-pending application Ser. No. 09/497,044, filed Feb. 2, 2000, and U.S. Pat. No. 6,536,239. However, in the molding operation disclosed in those applications, the exhaust tube must be heated to a very high temperature by means of a torch until the end region of the tube becomes soft. Then the torch is removed and the mold pieces are applied to the end region of the tube. During this time the torch is removed and until the mold pieces are applied, the end region of the tube. During this time the torch is removed and until the mold is applied, the tube may not have the desired softness. Overheating the tube end to compensate for the ensuing cooling may result in the tube end deforming in an undersired manner. The prior art schemes also require that the torch be moved via a motor or other control means under relatively high temperature conditions.

SUMMARY OF THE INVENTION

Applicants' invention is aimed at reducing the problems associated with the shaping of one end of a hollow cylindrical glass tube (e.g., an exhaust tube).

Known prior art techniques require the application of a torch to the end region of a tube until it reaches a malleable state and then the retraction of the heat source and the application of a mold to shape the end region. In contrast thereto, in accordance with Applicants' invention, a mold for shaping the end of a tube also includes means for heating the tube. Consequently, the mold serves the dual function of heating the tube and shaping it. This eliminates the need for a heat source separate from the mold. It also eliminates the need to retract the heat source from the tube before applying the mold to the tube.

Thus, one aspect of applicants' invention includes a mold for shaping the opening of a selected end region of a first, hollow, generally cylindrical glass tube, where the mold includes means for enabling the mold to function as a heat source for rendering the tube malleable so it can be shaped by the mold.

In one embodiment of the invention, the mold includes two elongated side pieces having inner surfaces designed to be applied around and along a selected end section of a cylindrical tube for shaping the selected end section of the cylindrical tube over a first distance from the end of the tube. The mold also includes an end plug having a cylindrical stub for insertion into the opening of the tube, at its selected end region, for shaping the rim and controlling the inner diameter of the cylindrical tube along a first distance from the end of the tube. One of the two elongated side pieces includes a gas distribution channel, formed within the side piece, for enabling the ejection of gas along an inner surface of the one side piece and an arrangement for coupling the gas distribution channel of the one elongated side piece to a source of gas for enabling the one side piece and the mold to function as a heat source.

Another aspect of the invention is directed to apparatus and method for shaping glass tubes incorporating a multi-piece mold of the invention. The apparatus includes a support means for holding the tube, other than at a selected region, and an actuatable mechanical holding means for holding the multi-piece mold in close proximity to the selected end region of the tube. The mold includes a heat source for supplying heat to the selected region of the tube for placing the selected region in a malleable state. When that condition is reached, the mold is applied to the selected region of the tube for shaping the selected end region of the tube to conform to the inner surfaces of the mold.

A method embodying the invention includes the steps of shaping the tube using the multi-piece mold embodying the invention and the apparatus for manufacturing the tube.

In one embodiment of the invention, a temperature sensing means controls the heat source and the application and retraction of the mold.

BRIEF DESCRIPTION OF THE DRAWINGS

In the accompanying figures like reference characters denote like components; and FIG. 1A is an isometric diagram of a starter tube connected to an exhaust tube shaped in accordance with the invention;

FIG. 1B is a cross sectional diagram of the exhaust and starter tubes of FIG. 1A;

FIG. 2 is a detailed cross sectional diagram of one end of an exhaust tube shaped to enable self-centering with a starter tube in accordance with the invention;

FIG. 2A is an enlarged view detailing the end section of an exhaust tube embodying the invention;

FIGS. 4A, 4B and 4C are more detailed cross sectional diagrams of a 3 piece mold embodying the invention for use in shaping an exhaust tube;

FIG. 4D is a cross section of a mold piece including an end cap and stub;

FIG. 8 is a cross sectional diagram of a mold embodying the invention for use in the system of FIG. 7, where the mold also functions as a heat source; and FIG. 9 is a block diagram of control circuitry for operating all or parts of the system of FIGS. 5, 6 and 7.

DETAILED DESCRIPTION OF THE INVENTION

Figure 2B:
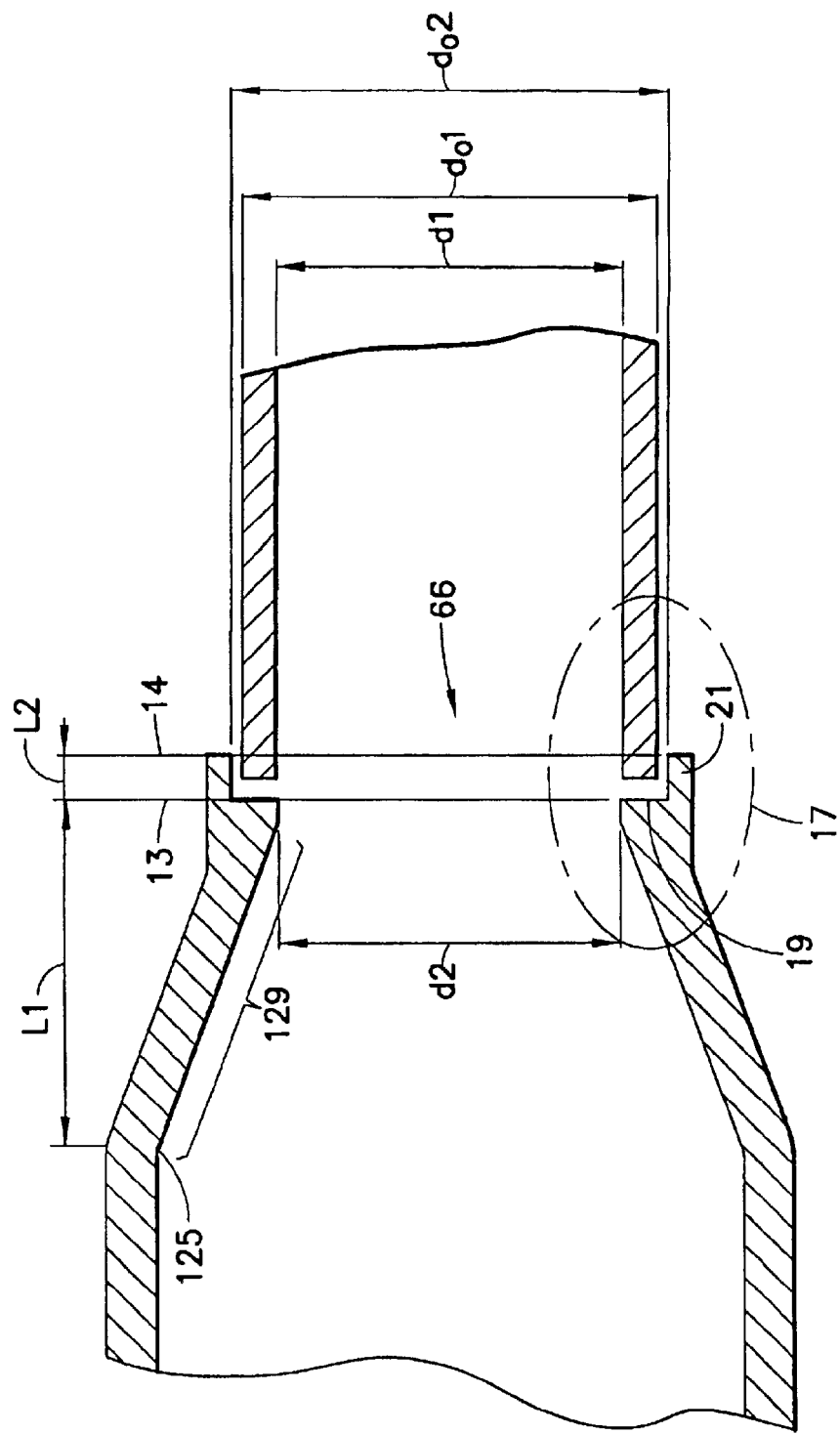
FIG. 2B is an enlarged view of the end section and opening of an exhaust tube, in accordance with the invention.

Referring to FIGS. 1A and 1B there is shown an isometric and a cross sectional diagram, respectively, of a "preform" tube 8, where the term "preform", as used herein and in the appended claims, refers to the combined, unitary, structure of a starter tube 10 and an exhaust tube 12. The starter tube 10 is a long cylindrical glass tube in which fiber optic layers are deposited to form the fiber optic strands. The exhaust tube, 12, is also a long cylindrical glass tube having, generally, and for most of its length, a larger diameter than tube 10. Tube 12 is preferably made with a larger diameter than tube 10 so that the gases escaping from tube 10 into tube 12 which get deposited along the inner walls of tube 12, particularly near the interface with tube 10, do not result in a build up which would block the passage of the gases. Also, a smooth transition to an increasing diameter allows for well controlled, more uniform flow of the gases and reactants. Therefore, tube 12 is connected to the starter tube 10 to allow gases to escape from the starter tube in a controlled manner. When the preform 8 is used in the manufacture of optic fibers, reactants and gas vapors are introduce into the end 11 of starter tube 10. The unused gases and vapors escape from the starter tube 10 at the end 13. It is important that the "excess" gases flowing out of the starter tube 10 into the exhaust tube 12 do so with as little turbulence as possible. Reducing turbulence helps ensure that the optic fiber layers are deposited more uniformly within the starter tube. To reduce turbulence, the exhaust tube 12 is preferably designed to have a larger diameter than the starter tube and to present no sharp curves or steps at the starter/exhaust tube interface. Furthermore, it is desirable that the exhaust tube be connected to the starter tube such that its center line (cl12) lies along an extension of the center line (cl1O) of the starter tube. This ensures that, when the preform is subsequently mounted in an apparatus to form optic fibers, the preform will rotate uniformly and evenly. The exhaust tube 12 is also designed to have a larger diameter than starter tube 10 to ensure that gases escaping from the starter tube and deposited along the inner surfaces of the exhaust tube do not unduly narrow the path for the escaping gases.

To ensure that the exhaust tube and the starter tube function as desired, an exhaust tube 12 was designed to have the profile shown in greater detail in FIGS. 2, 2A and 2B. The exhaust tube 12 has a larger inner diameter (dt2) than the inner diameter (d1) of the starter tube 10, except at, and near, point 13 where the exhaust tube 12 mates with the starter tube 10. The larger diameter of the exhaust tube 12 ensures that its cross sectional area will be greater than that of the starter tube to enable the exhaust gas and vapors to escape from the starter tube with little, if any, turbulence. Also, any deposition of gases and vapors along the inner walls of the exhaust tube will not result in a narrowing of the inner walls which would block the passage of any escaping gases and reactants before the starter tube is completely filled.

Referring to FIG. 2, note that exhaust tube 12 is a hollow, cylindrical, glass tube with an inner diameter dt2 from point 125 extending leftward to exhaust end 15. Starting at point 125 and extending rightward for a distance "L1", until point 13 of tube 12, the inner diameter of tube 12 is gradually reduced. Thus, over a distance "L1" starting from point 125 and ending at point 13, the inner diameter of tube 12 decreases from its nominal value (dt2) until, at point 13, its inner diameter has a value, d2, which is approximately equal to the inner diameter (d1) of starter tube 10. At the point 13, the exhaust tube 12 mates with the starter tube 10 and, at that point, the inner diameter of the exhaust tube 12 is then approximately equal to the inner diameter of the starter tube 10. That is, if the inner wall of the starter tube were extended it would be flush with the inner wall of tube 12, at, and about, the "mating" point 13

Note that along the length "L1" of the end section 121 of exhaust tube 12, a curve or taper is imparted to the inner and outer walls of the exhaust tube 12 to cause the inner diameter of the exhaust tube 12 to go smoothly from a value of "dt2" to a smaller value "d2" which is substantially equal to the inner diameter "d1" of tube 10. By way of example, dt2 is approximately 2 inches, while d1 and d2 are approximately 1 inch.

The end section of tube 12, beginning at point 125, and the opening (mouth) 66 of tube 12 are shaped to accommodate tube 10. Thus, as shown in FIGS. 2A and 2B, the rim region 17 of exhaust tube 12, extending between shoulder 19, and end 14, is specially shaped to accomplish several functions. First, beginning at shoulder 19, the inner diameter of tube 12 is now increased for a length "L2", until the end edge 14 of tube 12. The inner diameter of tube 12 is increased from a value of d2=d1, at point 13 shoulder 19, to a value which is just a little greater than $d_{o1}$, at end 14; where d1 and $d_{o1}$ are, respectively, the inner and outer diameters of starter tube 10. The increase in the dimension of the opening of tube 12, between points 13 and 14, is just enough to ensure that tube 10 can be "snuggly" inserted into tube 12 and to ensure that both tubes, when mated, have a common center line.

Note that, decreasing the inner diameter of tube 12 from point 125 to shoulder 19 and then increasing the inner diameter of tube 12 from shoulder 19 until the end produces a "stop" within tube 12 which prevents the starter tube from being inserted into tube 12 past shoulder 19. As shown in the figures, between points 13 and 14, the outer wall of exhaust tube 12 includes an extension 21 which extends beyond shoulder 19 for a distance "L2". In the region of extensions 21, the inner diameter of tube 12 is just a little greater than the outer diameter of tube 10. This ensures that tube 10 can be inserted "snugly" within the opening of tube 12 for a distance of approximately L2. As further discussed below (regarding FIG. 6) when heat is supplied to tube 12 after the insertion therein of tube 10, the extension 21 of tube 12 may "collaspe" about tube 10, thereby fusing/joining tubes 10 and 12 to form a unitary combined component, referred to herein as a "preform". Thus, the cross section of the exhaust tube profile is also shaped so as to provide a sufficient amount of "flowable" material within extension 21 which fuses into a smooth walled inner diameter joint upon completion of the heating (joining and/or fusing) process. That is, the inner walls at the interface of the starter and exhaust tubes are smooth, after the two have been joined or fused.

Region 17 defines a selfentering joint between tubes 12 and 10. This "self-centering" and "self-nesting" joint enables the starter and exhaust tubes to have a common center line, as shown in FIGS. 1B and 2. In the embodiments shown herein, the shape of the mating end (between lines 13 and 14) of the exhaust tube is modified to enable the exhaust tube to mesh, or nest, easily with the starter tube. Alternatively the shape of the starter tube could be modified. However, in the manufacture of fiber optic fibers, it is preferable that the diameter of the starter tube be kept constant and uniform over its full length to obtain the desired optic fiber quality. Therefore, only the shaping of the exhaust tube is discussed, even though the other possibility exists.

In FIG. 2, the rim portion 17 at the mating edge end of exhaust tube 12 is shown as an L-shaped ledge, or lip, 19, with an extension 21a, 21b. However, it should be noted that the inner opening or rim of tube 12 (i.e., the wall of the exhaust tube, between its inner and outer diameter over the length "L2") may have other shapes to ensure self-nesting between the exhaust and starter tubes. That is, the inner wall of tube 12, between points 13 and 14, may be shaped to have different forms to enable the starter tube to mesh and nest with the exhaust tube so that they both will have the same center line and to enable the two tubes to be joined and fused together easily.

Applicant' invention is also directed to the molds for shaping one end of the exhaust tube so it can mate with a starter tube. The molds enable the fabrication of exhaust tubes having consistently reproducible shapes and characteistics. In addition to providing a desired shape, molds embodying the invention function to control certain critical dimensions of the exhaust tubes formed with the molds. Thus, molds emboyding the invention enable the forming of exhaust tubes having more consistent dimensions and fewer defects and capable of nesting or mating with a starter tube.

Figure 3A:
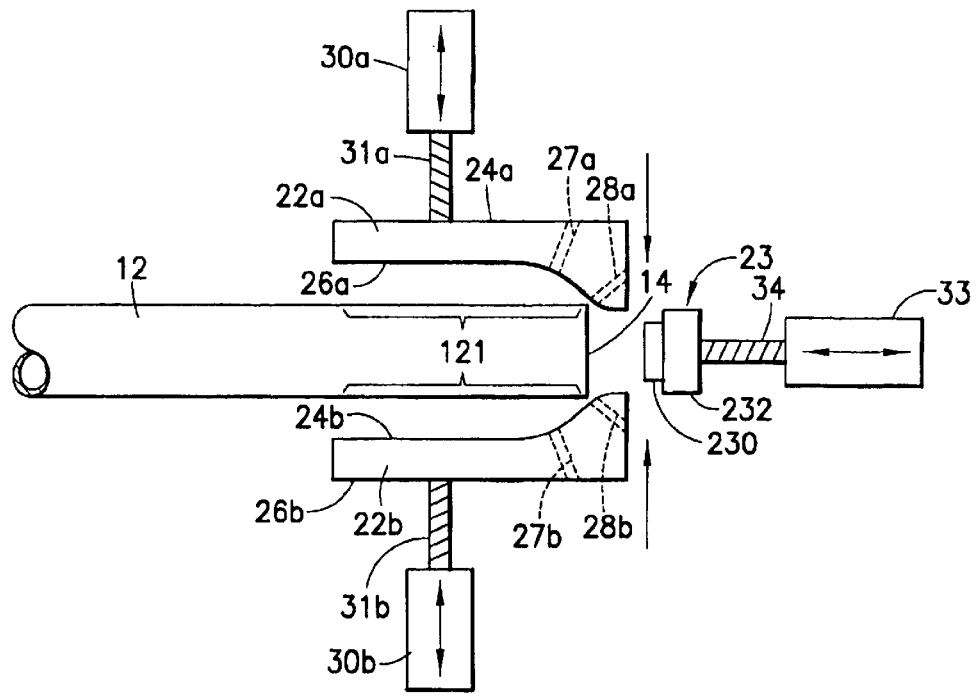
FIG. 3A is a cross section of a three (3) piece mold embodying the invention for shaping one end of an exhaust tube in accordance with the invention.

The shapes and functions of molds embodying the invention and their application to exhaust tubes are shown in FIGS. 3A, 3B, 4A, 4B, 4C and 4D. In FIG. 3A there is shown a simplified cross sectional diagram of a 3-piece mold which is about to be applied to a hollow cylindrical tube 12. In FIGS. 3B, 4A, 4B and 4C, the tube is shown as shaped by the mold. The 3-piece mold includes elongated side sections 22a, 22b and an end plug, or cap, 23. The side sections 22a and 22b are applied along an end section 121 of tube 12, extending from a point 127, past the bending point 125, the stop line 13 and past the end 14 of tube 12. The side sections impart a smooth taper to the end section of the tube 12 and reduce its inner diameter gradually such that at a point 13, the inner diameter of tube 12 matches that of starter tube 10, intended to be mated with tube 12. The resulting end section of tube 12 may be generally characterized as a substantially conical section. The end plug 23 includes a solid cylindrical stub 230 and an end cap section 232. The solid cylindrical stub section 230 is inserted into the orifice 66 at the selected end of hollow cylindrical tube 12 to shape the rim of the tube and to prevent the inner diameter of the tube 12 from decreasing below a predetermined value (e.g., approximately d1 of the mating starter tube). The solid cylindrical section 230 of plug 23 also has two sections (231, 233) of different size, whereby a step (see FIGS. 4A, 4B and 4D) is formed between the two sections. The step causes the shoulder 19 to be produced within the inner surface of tube 12 while the portion of the tube squeezed between the inner surfaces of mold pieces 22a, 22b and the outer surface of the cylindrical stub section 231 results in extension 21, between lines 13 and 14, as shown for section 17 in FIGS. 2, 2A and 2B. The end cap 232 functions to effectively seal the end 14 of tube 12. The application of the mold pieces, 22a, 22a, and 23, to a selected end of tube 12, after it has been rendered malleable, causes tube 12 to assume the form shown in FIGS. 2, 2A, and 2B.

FIG. 3A also shows that the two side pieces of the mold, 22a and 22b, are held by mechanical holding arms 31a, 31b, which may be selectively activated by air cylinders 30a, 30b, to cause the application and/or retraction of the side molds 22a, 22b to, or from, the cylindrical tube 12. The end plug, or cap, 23 of the mold is also held by a mechanical arm 34 which is coupled to air cylinder 33. When air cylinder 33 is activated, the end plug 23 is inserted into the tube end 14. The two side pieces of the mold may originally be part of a unitary sleeve-like structure which is cut (sawed) in half (or in a different ratio) to produce the two halves 22a, 22b. the outer periphery of the two side pieces as well as the outer periphery of plug 23 may include studs or holding holes or posts to enable holding arms 31a, 31b and 34 to securely hold and apply their respective mold section.

Figure 3B:
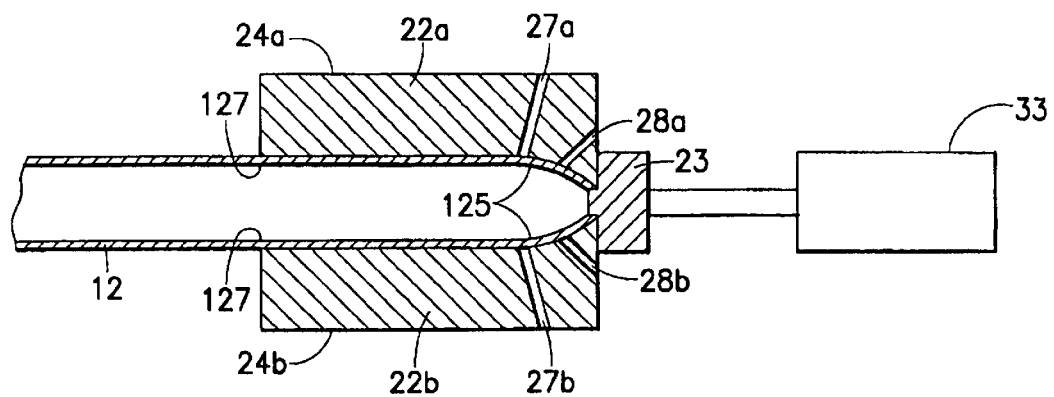
FIG. 3B is a cross section of a three (3) piece mold embodying the invention applied to one end of an exhaust tube for shaping it in accordance with the invention.

FIG. 3B is a simplified cross sectional diagram showing the general shape of tube 12 after the mold pieces have closed-in on the tube. The side pieces, 22a and 22b, extend along the length 121 of cylindrical tube 12 and impart a smooth taper along the length of the tube beginning at a point 125 and continuing to the end 14 of the tube. When joined together, the inner surfaces of side pieces 22a, 22b define an oblate cone-like shape. In their application, the side pieces extend from a point 127 along the tube 12 (rightward in FIGS. 3A and 3B) to the end 14 of the tube and a short distance beyond end 14 to complete shaping the end of tube 12 and receive the end plug 23. The end plug 23 ensures that the shape of the rim and the opening 66 at the mating end of tube 12 are as desired.

Figure 4A:
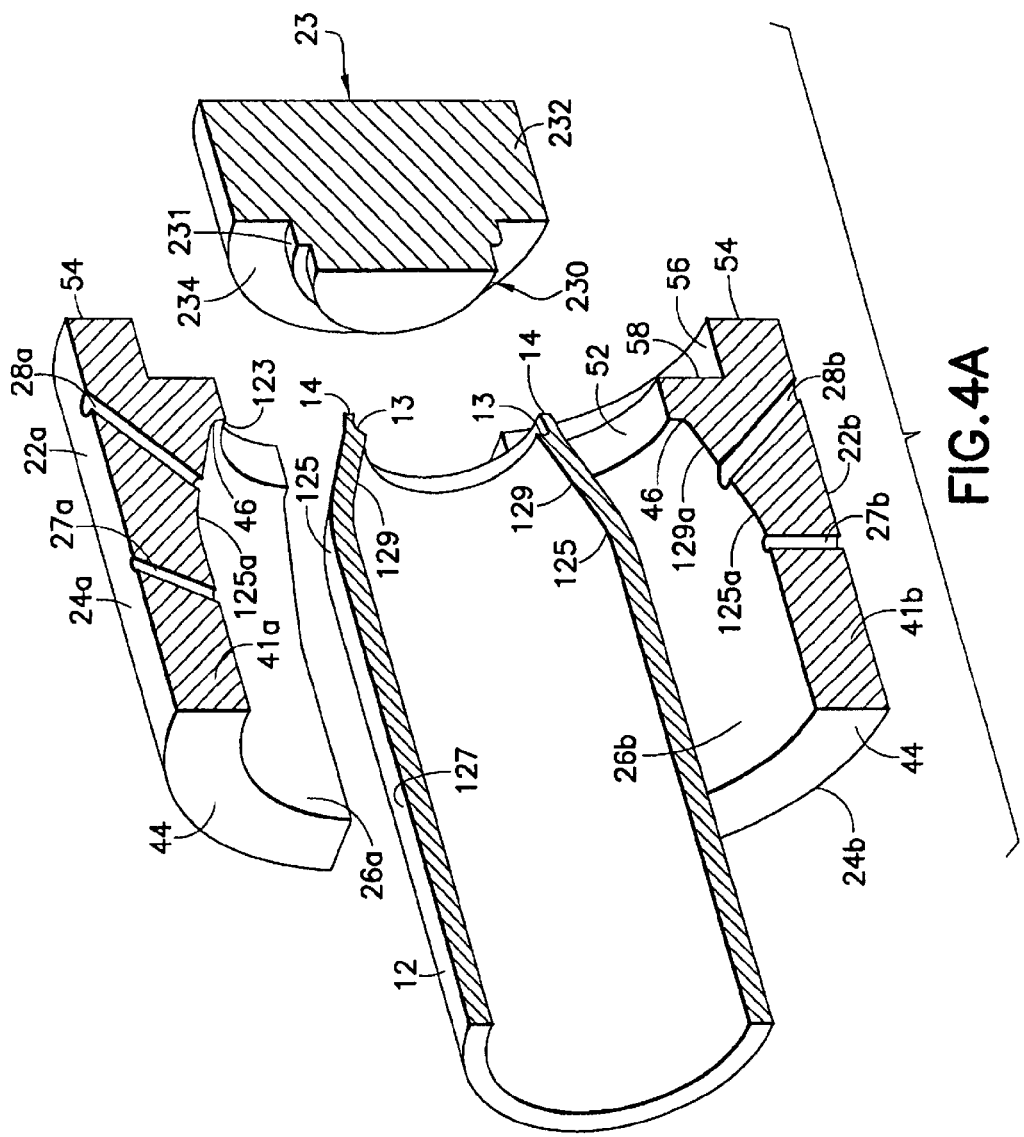
Figure 4B:
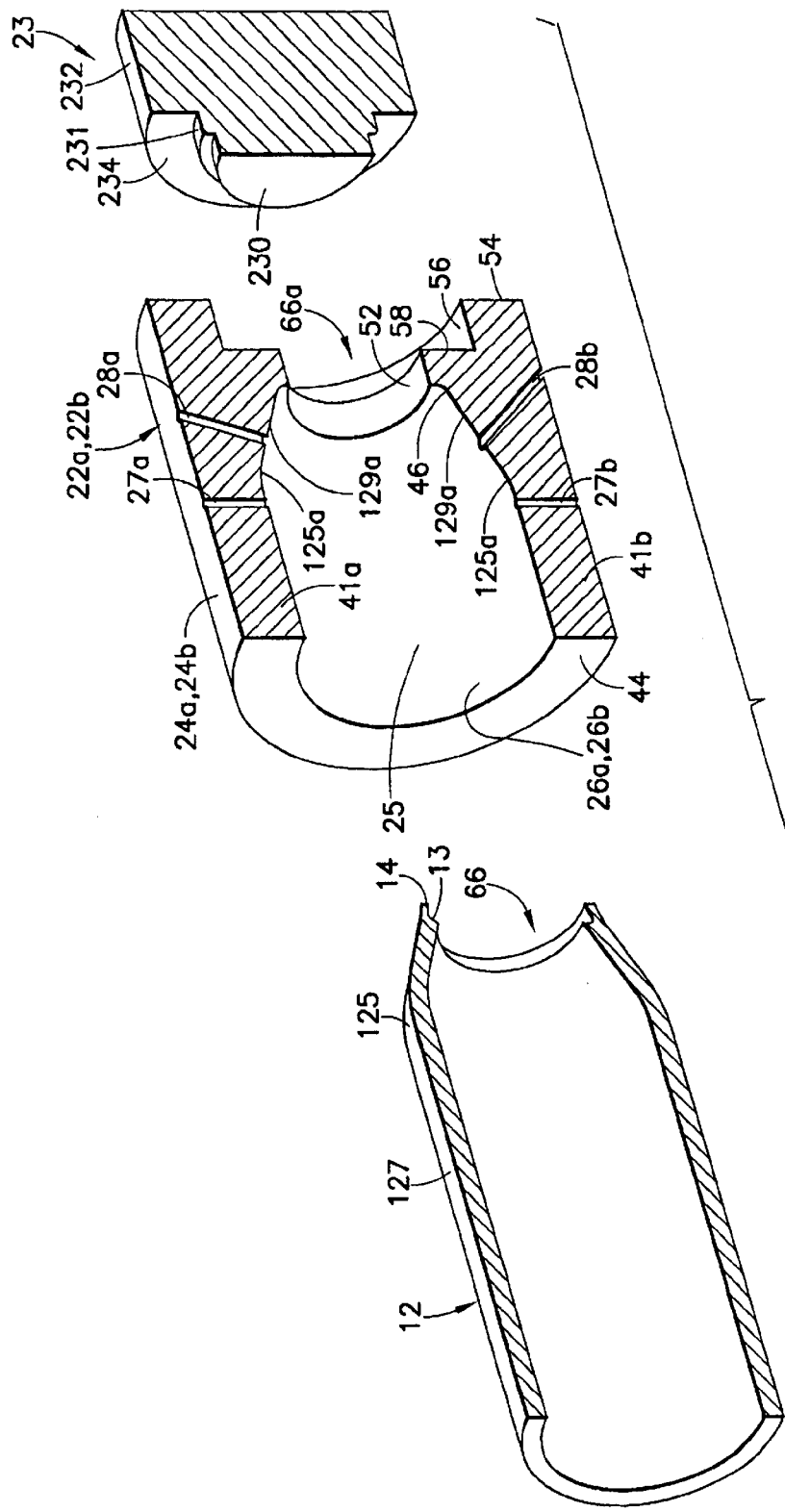

Various views of the mold pieces are shown in greater detail in FIGS. 4A, 4B, 4C and 4D. FIG. 4A is a break away cross sectional view of tube 12 and the three pieces of the mold, showing how the mold would be applied to tube 12. FIG. 4B is a break away cross sectional view of tube 12, the side mold 22a, and the end plug 23. FIG. 4C is a cross sectional diagram of the mold applied to the tube 12. FIG. 4D is a cross section of a cap with a two-section cylindrical stub. Referring to FIGS. 3A, 3B, 4A, 4B, 4C and 4D, the following features of the molds are noted.

Each one of the "side" mold components 22a and 22b has an outer surface 24a, 24b, and an inner surface 26a, 26b. The two side pieces 22a, 22b, are joined together and encircle the tube along the tail end of the tube extending from a point 127 until the end 14 of tube 12 and then past the end of tube 12. The inner surfaces of the side mold pieces are concentric for a length extending from point 127 until a bending point 125. Bending point 125 may be, for example, 2 to 4 inches from point 127, and approximately 1 inch from the selected end 14 of the tube.

From point 125 until the edge 123 (corresponding to shoulder 19 on tube 12), the inner surfaces of the side pieces 22a, 22b, taper down, conically, while leaving an opening 66a at the end of the mold (which also forms opening 66 in tube 12). At the point 123 on the inner surfaces of the mold (corresponding to shoulder 19 tube 12), the two side pieces, when joined, leave an opening 66a. The opening 66a needs to be sufficiently large to ensure that the inner diameter of the "shrunken" exhaust tube at shoulder 19 is approximately equal to the inner diameter of starter tube 10 while the outer diameter of tube 12 between lines 13 and 14 is just a little larger than the outer diameter of starter tube 10. This enables the starter tube to be inserted "snugly" into the opening of tube 12.

The two elongated side pieces 22a, 22b are complementary to each other and are intended to be joined along walls, 41a, 41b, so as to encircle tube 12 along its length, near its end 14 (the right hand side in the figures). The inner surfaces of the two side pieces 22a, 22b extend from a front, end 44 to a back end 54. The inner surface 26a, 26b, of the side molds define two general regions. The front region is a cavity 25 which extends from the front end 44 to a ridge 46 for receiving the tube 12 and imparting, a conical shape to the end section 121 of the tube 12. Each front region of the side pieces 22a, 22b has two sections. The first section extends from the first end 44 to a point 125a and the second section extends from point 125a to the ridge 46. Within the first section the inner surfaces of the side pieces are cylindrical. Within the second section (from point 125a to ridge 46) the cavity narrows forming a tapered segment 129a. Ridge 46 is bordered by a smooth cylindrical ring 52. The back region of the inner surfaces 26a, 26b of the molds is for receiving the solid cylindrical stub 230 of end plug 23 which controls the diameter of the end edge of tube 12 and shapes the rim and opening of tube 12. The second region of the side pieces extends from the back end of ridge 46 which is defined by a back wall, which is a smooth annular wall, A ledge 56 extends from back wall 58 to the back end 54 of the mold. When the two elongated side mold pieces 22a, 22b are joined together as shown in FIG. 3B, a circular opening 66a is formed around ring 52 corresponding to opening 66 of exhaust tube 12.

As shown in FIGS. 3A, 3B, 4A, 4B and 4C a plurality of ventilation channels 27a, 27b, 28a, 28b, are formed within the molds extending from the inner surfaces 26a, 26b to the outer surfaces 24a, 24b of molds 22a, 22b to enable air and/or gases trapped between the walls of the tube 12 and the inner surfaces of the molds to escape during the molding process.

The end plug 23 may be better described with reference to the simplified cross sectional diagram of FIG. 4D. Plug 23 includes an end cap section 232 from which extends (leftwards in the figures) a solid cylindrical stub 230. Solid cylindrical stub 230 has a first section 231 of diameter $d_o1$ and length L2 extending from the "inner" surface 234 of end cap section 232. The stub 230 has a second section 233 extending from the first section 231. The second section 233 is of diameter d1 and its length is not critical, so long as it is long enough to ensure that the inner diameter of tube 12 at shoulder 19 is establish. Thus, end plug 23 ensures that the opening 66 at shoulder 19 of tube 12 is approximately equal to a first value (e.g. d1) and that the inner diameter of the tube along length L2, between point 13 and end edge 14, is just greater than a second value (e.g., $d_{o1}$) to form a ledge or lip a distance L2 from the end 14 of tube 12 and to enable a starter tube to nest within the opening of tube 12 and abut against shoulder 19. In a particular embodiment, the value of d1 and d2 were equal to 22 millimeters, $d_{o1}$ was equal to 28 millimeters, $d_o2$ was equal to 29 millimeters, L1 was equal to 25 millimeters and L2 was equal to 5 millimeters and dt2 was approximately 55 millimeters.

End plug 23 may be held by a rod 34, or be part of the rod 34 (see FIGS. 3A, 3B). Plug 23 includes a solid cylindrical stub 230 extending from the end cap 232 of plug 23. A portion 232a (see FIG. 4C) of back portion 232 is designed to fit within the rear opening formed by the two sides pieces, 22a, 22b. The "inner" surface 234 of portion 232a is intended to fit against the wall 58 while resting on ledge 56. The solid cylindrical stub 230 extends through the ring 52 and can be inserted within the rear hollow neck of tube 12, to control the inner and outer diameter of tube 12 and shape of the tube opening in the end region between points 13 and 14. The solid cylindrical stub 230, includes a section 231 extending for a length L2 along the stub from the back plane 234. The section 231 causes the rim of tube 12 to have a desired shape such as the one shown in FIGS. 2, 2A and 2B. In the figures, a step is shown, between sections 231 and 233. However, a curve and/or other shaping structure or profile matching structure may be used.

The mold components may be manufactured to close tolerances from materials which can withstand the high temperatures of molten glass. Examples of appropriate materials include cast iron or steel coated with a ceramic or other coating resistant to the high temperatures. It is important that any ceramic coating used will not contaminate the glass products being manufactured.

Certain mold configurations have been shown, but it should be understood that many variations and modifications may be made without departing from the spirit and scope of the inventive aspects of the molds to shape tubes.

Figure 5:
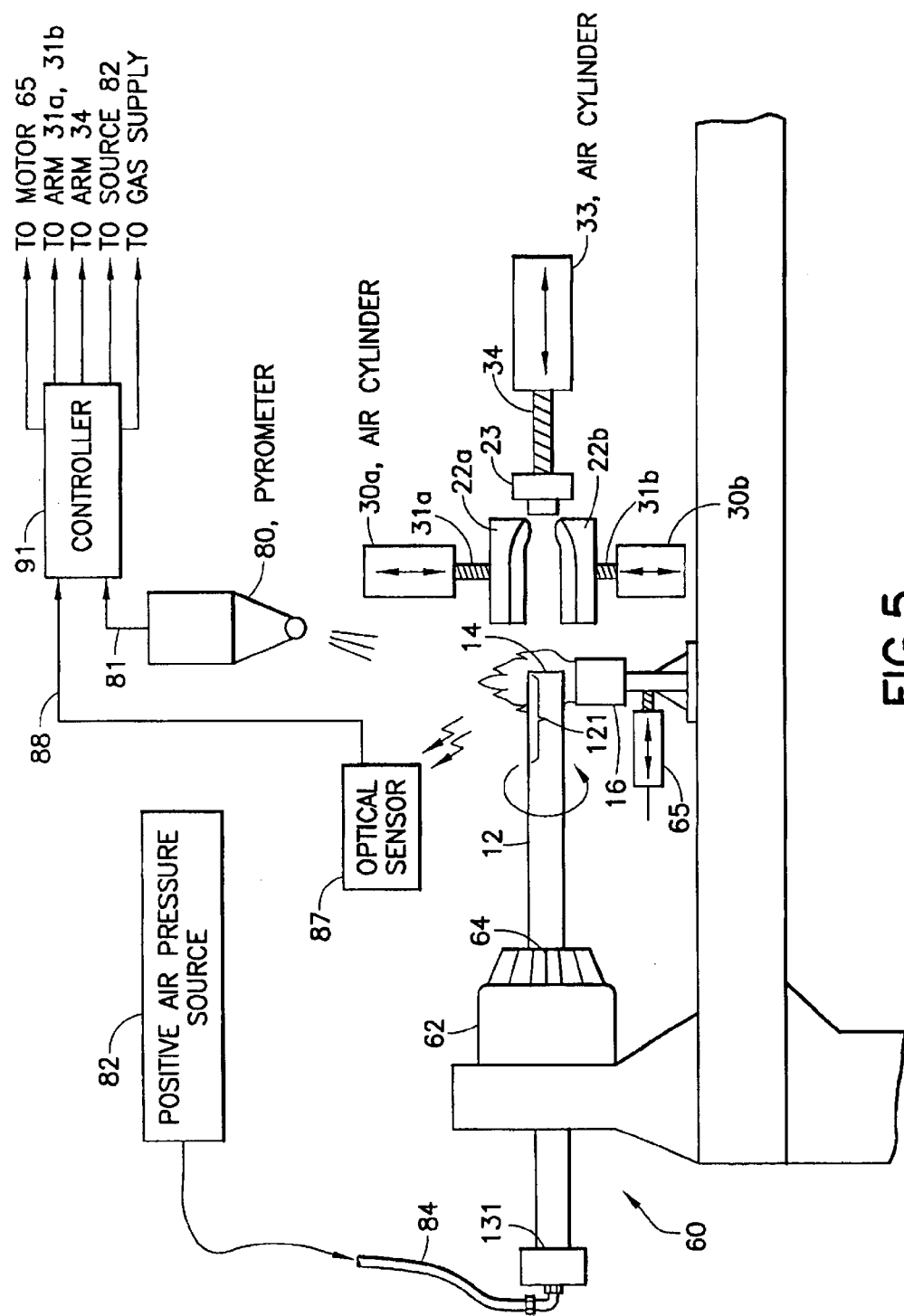
FIG. 5 is a simplified diagram of a system for forming an exhaust tube in accordance with the invention.

Referring to FIG. 5, there is shown an apparatus for semi-automatically, or automatically, applying the mold pieces to a hollow cylindrical glass tube 12 for shaping a selected end 121 of the tube. Tube 12 is firmly positioned within a central opening 64 of a rotatable chuck 62 of a horizontally mounted controlled speed lathe 60. The lathe 60 supports tube 12 and ensures that tube 12 is rotated at a controlled speed. A heat source 16 is positioned such that the selected end portion, 121, of tube 12 is heated to a temperature, which causes the end of tube to become soft and malleable. The heat source 16 may be an oxygen-hydrogen torch, but any other suitable heat source may be used. The temperature of the heat source applied to the tube can be measured by a pyrometer 80 having an output which can be coupled to control circuitry (see FIG. 9) for controlling the heat supplied to the tube end, 121. The output of pyrometer 80 may also be used to control the application and retraction of the heat source, 16, and the application and retraction of the mold pieces applied to the tail end of the tube 12. The heat source 16 may be moved back and forth via motor 65 which may be controlled by an output from pyrometer 80, or by other means such as an optical sensor (e.g., photosensor 87), or manually, and/or by any other independent or related means.

When the tube segment 121 reaches the desired temperature for forming, the heat source 16 is removed and a multi-part mold (see FIGS. 3 and 4) is applied to the end section 121 of tube 12. FIG. 5 shows (symbolically) that the sections 22a and 22b of the mold are held by mechanical holders 31a, 31b and that the end plug 23 is held by a mechanical holder 34. The mechanical holders are, in turn, coupled to air cylinders 30a, 30b and 33 which control the application of their respective mold portions to tube 12. Air cylinders 30*a* and 30*b* control the application and retraction of mold pieces 22*a* and 22*b*. Air cylinder 33 controls the application of the end mold piece 23, which may also be referred to as a forming plunger or a roll forming tool. The actuation of air cylinders 30*a*, 30*b* and 33 may be controlled by an output from pyrometer 80 and/or by other independent means or by other means such as an optical sensor (e.g., photosensor 87), or manually, and/or by any other independent or related means. As noted above, the mold sections may have holding studs or holes located along their outer surface or along their end faces (e.g., 44,54 for 22*a* and 22*b*).

When the tube is heated to the point that it is rendered soft and malleable, the torch 16 may be turned off and/or moved out of the way. The two side sections 22*a* and 22*b* of the mold are applied around the periphery of tube 12, along its tail end, for imparting a smooth curve to the tail end of the tube. The two side pieces 22*a*, 22*b*, leave an opening at their end, which opening faces the end (or opening) of tube 12. End plug 23 is positioned such that it fits through the opening between the ends of the two side molds, 22*a*, 22*b*, and end cap 232 seals the opening between the ends of the two side molds. Plug 23 is also inserted within the opening 66 of tube 12 for shaping the rim of tube 12 and ensuring the proper dimensioning of the inner and outer diameters of tube 12 in the region 13, 14, as discussed above. Thus, the end piece 23, in combination with the side mold pieces, 22*a*,22*b*, imparts an L-shaped lip (or ledge) to the inner rim of tube 12 and also controls the inner and outer diameters of tube 12, to enable a starter tube to "nest" and/or mate within the opening of the exhaust tube 12.

During the heating and molding of tube 12, positive air pressure from a source 82 is applied via tubing 84 to the one end 131 of tube 12 which is not being shaped. The positive pressure supplied within the tube 12 causes its walls to push back against the mold and to conform more exactly to the shape being imparted by the pieces of the mold. Air escapes from within the mold system cavity through a plurality of ventilation channels (27,28) in the side mold pieces. After the tube is formed and the system has stabilized, the mold pieces are retracted from the tube, the air pressure is discontinued and the exhaust tube is allowed to cool. That is, after the mold pieces have been applied for a predetermined period for shaping the exhaust tube, the molding components 22*a*, 22*b*, and 23 are retracted to allow the glass tube to cool and to then be removed from the equipment.

The apparatus of FIG. 5, as further detailed with respect to FIG. 9, may be part of a semi-automatic or automatic system for molding and shaping a selected end of the exhaust tube to mate with the starter tube.

Thus, according to one aspect of the invention, exhaust tube 12 may be shaped semi-automatically or automatically, with a simple, closed loop, control system. This eliminates the "art" used in the prior art forming method and replaces it with a method and apparatus for forming tubes having more consistent form dimensions, with fewer defects and fewer unusable products. Consequently, the manufacture of exhaust tubes and preforms in accordance with the invention leads to increased productivity in the manufacture of optical fibers.

Thus, in accordance with the invention, glass tubes may be formed which have reproducible dimensions and consistently have the same shape resulting in a reduced number of defective products and eliminating the need for manually forming the glass tubes.

Although a particular embodiment has been described, it is to be understood that the present disclosure is only by way of illustration and that numerous changes in the shape of the tubes and in the construction of the molds may be made without departing from the spirit and scope of this invention.

DETAILED DESCRIPTION OF FIG. 6—FUSING/JOINING THE TUBES

Figure 6:
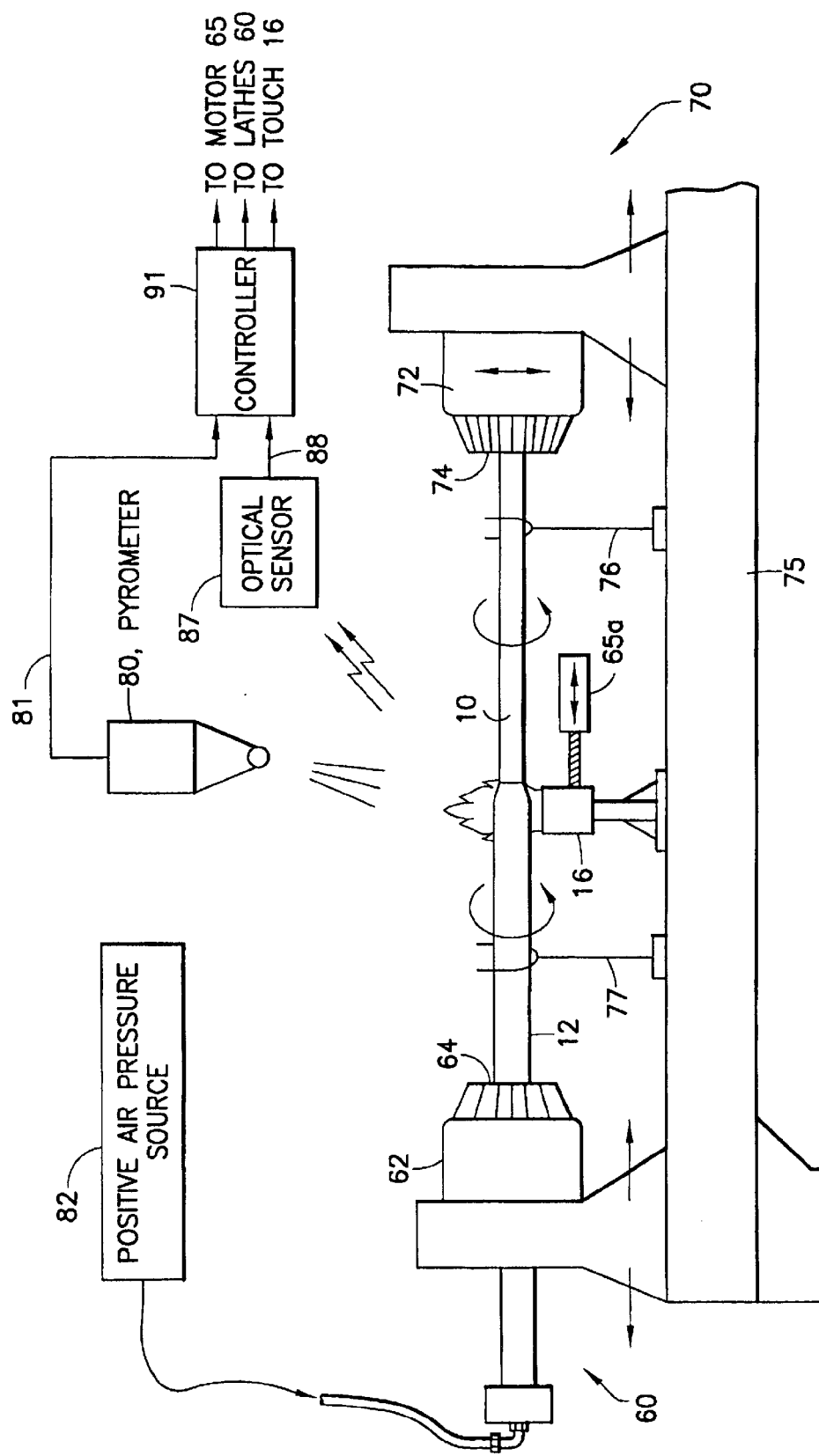
FIG. 6 is a simplified diagram of a system for joining an exhaust tube with a starter tube to produce a "preform" in accordance with the invention.

The apparatus shown in FIG. 6 illustrates the joining/fusing of a starter tube 10 with an exhaust tube 12 formed in accordance with the invention. The exhaust tube 12 is mounted within the chuck of a lathe 60, as shown in FIG. 5. The starter tube 10 is mounted in the opening 74 of a chuck 72 of a lathe 70. Lathes 60 and 70 may be controllably moved laterally along the surface of a bed 75. To aid in the alignment of tubes 10 and 12 adjustable supports 76 and 77 are provided. In addition to being adjustable height wise, these supports 76, 77 may be moved laterally along the surface of bed 75. The supports 76, 77 assist in the alignment of the two tubes; however, unlike in the prior art, the supports are not absolutely necessary since the tubes formed, in accordance with the invention, nest within each other at their mating end. By proper adjustment of the height of chuck 72 and the height of supports 76 and 77, tubes 10 and 12 may be aligned on center. Then, the lathe 70 (or lathe 60) is moved laterally until tube 10 is snuggly and firmly inserted within tube 12, with the end of tube 10 resting against the ledge 19 at line 13 of tube 12, as shown in FIGS. 2 and 2B, above. Due to the shaping of the opening of tube 12, as discussed above, the mating end of starting tube 10 is brought into contact with the mating end of exhaust tube 12, with the starter tube nesting within the corresponding mating end of exhaust tube 12 as detailed above for FIGS. 2, 2A and 2B. Thus, both the exhaust tube 12 and the starter tube 10 are respectively held within the chucks of a first, 60, and second, 70, supporting means as shown in FIG. 6. After the two tubes are properly aligned, they are rotated in synchronism by rotating chucks 62 and 72. Then, a torch 16 is applied to the mating region of the two tubes until their mating ends are fused and/or joined. The starter and exhaust tubes are joined along lip 19 and around the rim (region 13–14) with the glass flowing between the two so that the inner surface going from the starter tube to the exhaust tube is smooth, solid and continuous.

The heat of the torch is sensed by a pyrometer 80 and is well controlled to ensure proper joining/fusion of the two tube ends. When the sealing of the two tubes is completed the torch is retracted. Then, the combined starter tube with the exhaust tube attached is removed from the apparatus, producing a preform having the shape and desired profile shown in FIGS. 1A and 1B.

DETAILED DESCRIPTION OF FIGS. 7 AND 8

In the shaping operation shown in FIG. 5, the end 121 of tube 12 must be heated to a temperature by means of a torch 16 until the tube end becomes soft. Then the torch is removed and the mold pieces are applied to the tube end. During the time the torch is removed and until the mold pieces are applied the tube end undergoes some cooling, whereby when the mold is applied it may not have the desired softness. Overheating the tube end to compensate for the cooling may result in the tube end deforming in an undesired manner. The prior art scheme also requires that the torch be moved via a motor or other control means under relatively high temperature conditions. These, and other problems pertaining to the timing of the molding operation may be resolved using a mold of the type shown in FIG. 8 and applied to a tube as shown in FIG. 7.

Figure 7:
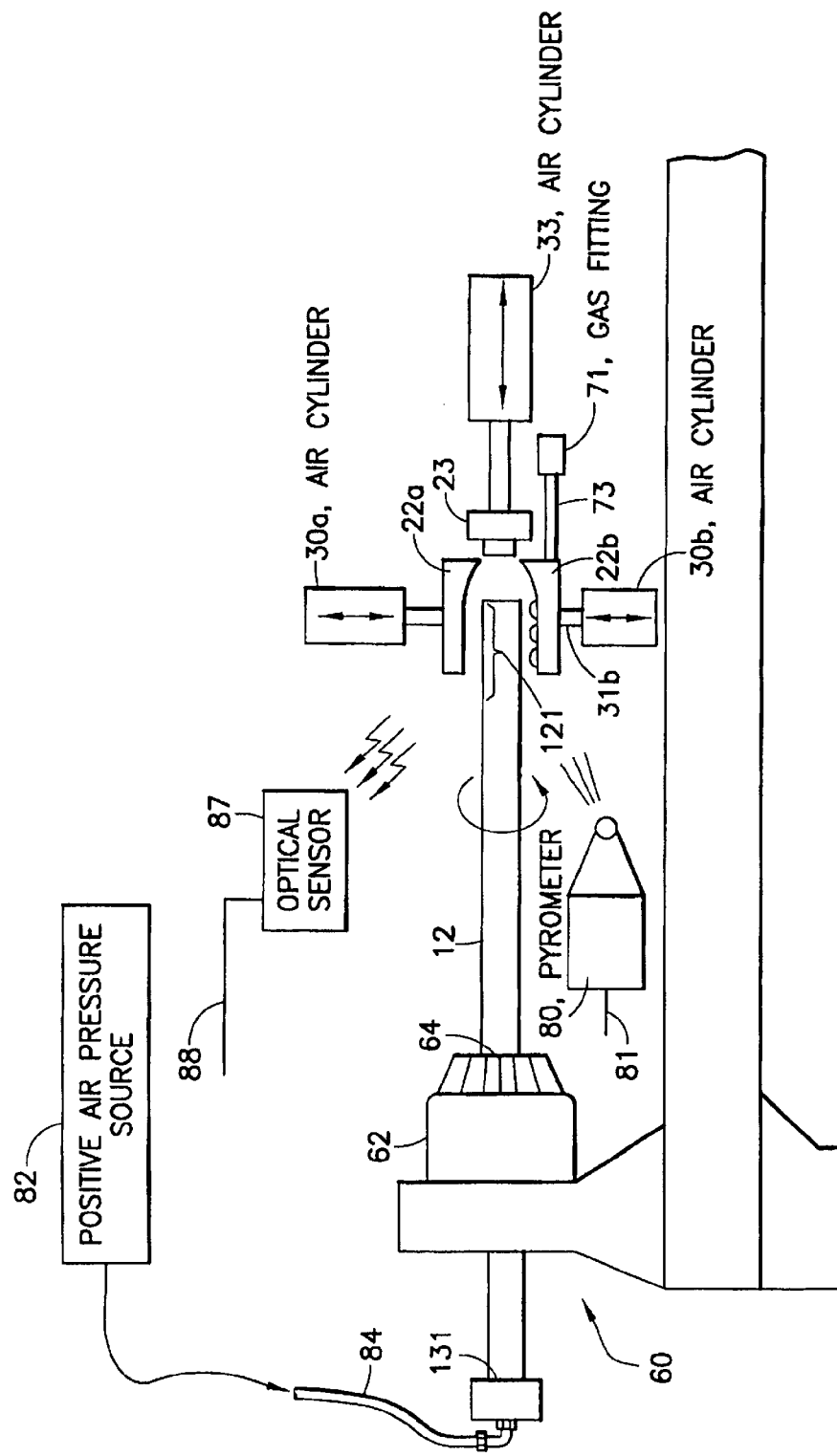
FIG. 7 is a simplified diagram of a system in which a mold also includes a heat source for forming an exhaust tube in accordance with the invention.

FIGS. 7 and 8 show an embodiment of the invention where the mold may be modified to also function as a torch to heat the end of the tube it is intended to shape. The mold used in the system of FIG. 7 and, as further detailed in FIG. 8 may be similar to the mold shown in FIGS. 3 and 4, with the exception that in FIGS. 7 and 8 the bottom mold is modified to act as a torch, eliminating the need for torch 16, shown in FIG. 5, and eliminating the need to retract the torch when the mold is applied to the contour of the tube for shaping it. Referring to FIG. 7, note that the bottom mold portion 222b is connected via tubing 173 to a gas fitting 171 to which is supplied a gas source 175. Referring to FIG. 8, note that the mold 180 is a three-piece mold which includes two side pieces 22a and 222b, and an end cap 23 with a cylindrical stub. Side piece 22a and plug 23 are similar to the like numbered mold components shown in FIGS. 3 and 4. The elongated side piece 222b is similar in shape to side piece 22b in FIGS, 3 and 4. However, side piece 222b includes channels formed within the mold component for distributing gas to the burners (or jets) 223 distributed along the inner surface of the side piece 222b. When lit, the burners/jets 223, at the inner surface of the side mold 222b, will provide heat of similar intensity as torch 16 in FIG. 5. The inner surface of side mold section 222b is shaped to have a similar contour to the section of the tube it is intended to heat and shape. Thus, the heating provided by its burners/jets is uniform and efficient. The inner surface of section 222b may be made to encircle a greater portion of tube 12 (i.e., the inner periphery of section 222b is larger than that of 22a) to provide sufficient uniform heat to the tube that the tube need not be rotated. As noted, gas is supplied to the mold component 222b via tubing 173 which terminates in a fitting 171 to which is applied a gas source 175. Thus, the mold functions like a torch when the gas is supplied and ignited.

In FIG. 8, only the bottom mold component 222b is shown to have gas burners. It should be appreciated that mold component 22a could likewise be modified to have gas burners at its inner surface. Similarly, mold component 23 could likewise be modified to include gas burners at its inner surface. It should also be appreciated that a heat source other than a gas based heat source could be incorporated in the mold components. That is, induction or resistive heater as well as a plasma arc could be used. It should also be appreciated that a heat source could be incorporated into a mold to manufacture any suitable item. That is, the incorporation of a heat source into a mold is not limited to the shaping/manufacturing of cylindrical glass tubes.

The apparatus of FIG. 7, like that of FIG. 5, may be used to semi automatically or automatically shape the tube using the mold 180 of FIG. 8. A tube 12 may be mounted in the lathe 60 and the tube may be rotated. Mold section 222b is first brought in close proximity to the tube section 121 to heat the section 121 so it can be shaped by the mold. The movement of mold section 222b to be in close proximity with tube 12 may be accomplished manually or by controlling the arm 31b and air cylinder 30b. Gas may be supplied to the mold and the gas ignited, supplying heat to the tube section. The application of the gas and the amount of gas supplied may be controlled manually, semi-automatically or automatically. A pyrometer 80 is positioned to sense the heat of the selected section 121 of the tube. An output line 81 from pyrometer 80 may be coupled to control circuitry (e.g., 91 in FIG. 9) to control the amount of gas supplied and the length of time the gas heat is applied to the tube. The point at which the tube becomes malleable may be sensed in any of the following ways: a) visually, by an operator; b) optically, by means of a photosensor 87 having an output line 88; and/or c) by means of a temperature sensor 80. If sensing is done visually by an operator, the operator can operate controls 30b to engage air cylinders 30a and 33 to clamp mold pieces 22a, 222b and 23 around and into tube 12. If sensing is done by sensors 80 and/or 87, when the desired degree of tube softness is reached, the sensors 80 and/or 87 can supply a signal to a microcontroller 91 (see FIG. 9) which then activates the controls 30a, 30b and 33 to cause the mold pieces to be moved around and into the tube to shape it as desired. Following the application of the mold to the tube and after allowing the tube to cool, the mold pieces may be retracted manually or automatically. As in FIG. 5, positive air pressure is supplied through the tube end 131, which is not being shaped, while the tube end 121 is being heated and being molded. The air pressure may be applied manually or automatically.

In contrast to the system of FIG. 5, in FIG. 7 the bottom piece mold 222b containing the heat source would first be brought into close contact with tube 12 which, if rotation is necessary, would be rotated as in FIG. 5 so that the selected end segment to be shaped would rotate through the flame provide by 222b until the specific temperature causing the end 121 to soften and become malleable is reached. At that point the air cylinders 30 and 30b would urge the side molds 22a and 222b against the tube and air cylinder 33 would urge the end plug 23 through the opening of the mold and into tube 12 to shape the rim of the tube and its opening diameter.

The advantage of using the mold as a torch, is that it eliminates the need for a separate heating element (e.g., torch 16) and avoids the need to move the torch out of the way when the mold is applied to the end of the tube. Also, at least the bottom portion of the mold will initially be at a high temperature making the shaping of the tube easier. Also the heating by the mold pieces may be configured to avoid the need to rotate the tube.

DETAILED DESCRIPTION OF FIG. 9

FIG. 9 is a simplified electrical block diagram of a control system which may be used to operate and control the apparatus of FIGS. 5, 6 and 7. The control system includes a microcontroller 91 to which input signals may be applied from a number of different sources. FIG. 9, like FIGS. 5 and 6, shows a pyrometer 80 supplying input signals to controller 91 on a line 81. FIG. 9, like FIGS. 5, 6 and 7, shows an optical sensor 87 supplying input signals to controller 91 via a line 88. FIG. 9 also shows manual inputs 89 (e.g., switch closures) causing the application of input signals on a line 90. In response to the various control signals, the controller 91 produces a signal on a line 92 to control the amount of gas supplied to the heat source (16 or 222b) and hence, the intensity of the heat produced by the heat source (e.g., torch 16 in FIGS. 5 and 6, and torch/mold 222b in FIG. 7). The controller 91 supplies signals on lines 93 and 94 to control the turn-on and turn-off of the lathe 60 (and/or lathe 70) as well as the rotational speed of the lathe. These signals may also control, where necessary, the lateral movement of the lathe, as well as adjusting the height of the chuck or member holding the piece being worked on. The controller also produces signals on output lines 96a, 96b and 97 to control air cylinders 30a, 30b, and 33 to advance and retract the mold components around tube 12 and into tube 12, as it is being molded. The controller 91 also includes an output line 98 for controlling the application of positive air pressure within the tube being shaped. The controller 91 also includes an output 99 applied to the motor 65 for controlling the movement of the torch in FIGS. 5 and 6. The function/action commanded by controller 91 can be sensed by the various optical and temperature sensors shown, enabling closed loop operation.

As is evident from the above, the system allows the shaping of the exhaust tube and/or the mating of an exhaust tube and a starter tube to be done semi-automatically or automatically.

As is also evident from the above, in response to signals from the pyrometer, the controller produces signals controlling the amount of gas being supplied to the torch. The heat supplied by the torch to the tube may be continuously controlled ensuring that neither too much nor too little heat is applied. The controller can also sense the length of time for which the heat is applied to ensure that the tube portion being heated is heated to a malleable condition.

Also, though not shown in detail, optical sensors (e.g., photosensor or laser sensors or any suitable viewing device) may be used to sense the condition of the tube section being heated and provide a signal indicative of the condition of the tube (i.e., whether it has reached a sufficient degree of softness to be malleable). When the tube is found to be malleable, a signal may be fed to control the heat source and the application of the molds for shaping, as described above.

Certain mold and system configurations have been shown, but it should be understood that may variations and modifications may be used to the molds and to the system without departing from the spirit and scope of the invention.

What is claimed is:

1. A multi-piece mold for shaping an end portion of a glass tube having an opening, said mold comprising:
    two side pieces which, when joined, form a cavity which can enclose an end portion of a tube for shaping the tube; and
    an end plug including an end cap and a cylindrical stub having a diameter less than a diameter of said end cap, said stub being configured for insertion into the opening of the tube for allowing rotational movement of the tube about said cylindrical stub for controlling the inner diameter of the tube;
    wherein at least one of said side pieces includes a heat source, formed within the one piece, for heating the tube to render it malleable.

2. A multi-piece mold as claimed in claim 1, wherein the heat source includes distribution channels through which gas may be distributed with gas jets emanating along the inner surface of at least one of the pieces.

3. A multi-piece mold, as claimed in claim 2, wherein the distribution channels within at least one piece are coupled to tubing coupling the distribution channels to a gas fitting to which a source of gas may be attached.

4. A multi-piece mold as claimed in claim 2, wherein ejection of gas occurs at several points along the inner surface of at least one piece.

5. A multi-piece mold as claimed in claim 2, wherein at least one of said pieces includes ventilation channels extending between its inner and outer surfaces to enable air and gases trapped between outer walls of the tube and the inner surfaces of the mold to escape.

6. A multi-piece mold as claimed in claim 2, wherein the pieces of the mold are formed of material capable of operating at temperatures in excess of the melting point of glass and without contaminating the glass.

7. A multi-piece mold as claimed in claim 1 wherein the heat source includes heating gas distribution channels, formed within the one piece of said multi-piece mold, with said distribution channels formed to eject gas along an inner surface of said one piece of said multi-piece mold.

8. A multi-piece mold as claimed in claim 1, wherein said tube is an exhaust tube shaped to mate with a starter tube, such that the exhaust and starter tubes can be joined easily at their mating ends.

9. Apparatus for shaping an end portion of a glass tube having an opening, said apparatus comprising:
    means for holding the tube and for imparting rotational motion to the tube;
    a multi-piece mold having two side pieces for imparting a substantially conical shape to a an end portion of the tube while leaving an opening for accessing the opening of the tube, one of said side pieces having a heat distribution source formed therein, and wherein said mold includes an end plug having an end cap and a cylindrical stub having a diameter less than a diameter of said end cap, said stub being configured for insertion in the opening of the tube for allowing rotational movement of the tube about the end plug for controlling the inner diameter of the tube at its end surface; and
    an actuatable mechanical holding means for holding the multi piece mold, including means for holding the one piece in which is formed a heat distribution source, in proximity to the selected portion of the tube for heating the selected tube portion to render it malleable, and for selectively applying the mold pieces to the tube for shaping the selected portion of the tube.

10. An apparatus as claimed in claim 9, wherein the apparatus includes temperature sensing means for sensing the temperature of the selected portion of the tube; and wherein the apparatus includes means responsive to a signal from the temperature sensing means for applying the mold pieces to the selected portion of the tube.

11. An apparatus as claimed in claim 9, further comprising means for supplying positive air pressure to the tube, while the end portion of the tube is being heated and molded, to cause the tube to conform to the shape being imparted by the mold.

12. An apparatus as claimed in claim 9 wherein the apparatus includes a temperature sensor for sensing the temperature of a selected portion of the tube for producing an actuating signal coupled to the actuatable mechanical holding means when the temperature of the selected end portion is such that the tube is malleable.

13. The apparatus as claimed in claim 12 wherein the heat distribution source functions as a torch and wherein said temperature sensor functions to control the intensity of the torch.

* * * * *